US011466116B2

(12) United States Patent
Frischmann et al.

(10) Patent No.: US 11,466,116 B2
(45) Date of Patent: Oct. 11, 2022

(54) POLYURETHANE BEING SUITABLE AS BINDER FOR A MODULAR PRINTING INK SYSTEM

(71) Applicant: HUBERGROUP ITALIA, Bolzano Vicentino (IT)

(72) Inventors: Lutz Frischmann, Ismaning (DE); Ursula Borgmann, Grafing (DE); Giuseppe Ciriello, Montale (IT); Sylvia Klausnitzer, Bruckmuhl (DE); Vijay Wagh, Muchen (DE)

(73) Assignee: HUBERGROUP ITALIA, Bolzano Vicentino Vi (IT)

( * ) Notice: Subject to any disclaimer, the term of this patent is extended or adjusted under 35 U.S.C. 154(b) by 263 days.

(21) Appl. No.: 16/477,145

(22) PCT Filed: Dec. 22, 2017

(86) PCT No.: PCT/EP2017/084498
§ 371 (c)(1),
(2) Date: Jul. 10, 2019

(87) PCT Pub. No.: WO2018/130412
PCT Pub. Date: Jul. 19, 2018

(65) Prior Publication Data
US 2019/0359758 A1 Nov. 28, 2019

(30) Foreign Application Priority Data
Jan. 11, 2017 (EP) .................................... 17151032

(51) Int. Cl.
| | |
|---|---|
| *C08G 18/32* | (2006.01) |
| *C08G 18/08* | (2006.01) |
| *C08G 18/48* | (2006.01) |
| *C08G 18/66* | (2006.01) |
| *C08G 18/75* | (2006.01) |
| *C09D 11/033* | (2014.01) |
| *C09D 11/037* | (2014.01) |
| *C09D 11/102* | (2014.01) |
| *C08G 18/12* | (2006.01) |
| *C08G 18/22* | (2006.01) |
| *C09D 175/00* | (2006.01) |
| *C09D 175/08* | (2006.01) |
| *C09D 175/12* | (2006.01) |

(52) U.S. Cl.
CPC ......... *C08G 18/3206* (2013.01); *C08G 18/08* (2013.01); *C08G 18/12* (2013.01); *C08G 18/222* (2013.01); *C08G 18/3234* (2013.01); *C08G 18/3271* (2013.01); *C08G 18/4825* (2013.01); *C08G 18/4854* (2013.01); *C08G 18/6674* (2013.01); *C08G 18/755* (2013.01); *C09D 11/033* (2013.01); *C09D 11/037* (2013.01); *C09D 11/102* (2013.01); *C09D 175/00* (2013.01); *C09D 175/08* (2013.01); *C09D 175/12* (2013.01)

(58) Field of Classification Search
CPC ........................... C08G 18/3206; C08G 18/08; C08G 18/3234; C08G 18/4825; C08G 18/4854; C08G 18/6674; C08G 18/755; C08G 18/12; C08G 18/222; C08G 18/3271; C09D 11/033; C09D 11/037; C09D 11/102; C09D 175/00; C09D 175/08; C09D 175/12
See application file for complete search history.

(56) References Cited

U.S. PATENT DOCUMENTS

| | | | | |
|---|---|---|---|---|
| 4,657,964 | A * | 4/1987 | Lai ..................... | C08G 18/0804 524/409 |
| 5,047,294 | A * | 9/1991 | Schwab ............. | C08G 18/0819 428/423.1 |
| 2008/0199625 | A1* | 8/2008 | Niwa ..................... | B05D 7/542 427/407.1 |
| 2011/0101083 | A1 | 5/2011 | Matsuzaki | |
| 2012/0071808 | A1* | 3/2012 | Sato ........................ | A61L 15/58 602/54 |
| 2013/0041072 | A1* | 2/2013 | Sommer ................ | C08G 18/68 523/415 |
| 2014/0370301 | A1* | 12/2014 | Sekito ................ | C08G 18/0823 428/423.1 |

(Continued)

FOREIGN PATENT DOCUMENTS

| | | |
|---|---|---|
| CN | 101328383 A | 12/2008 |
| CN | 101824132 A | 9/2010 |
| CN | 104119831 A | 10/2014 |

(Continued)

OTHER PUBLICATIONS

Chinese Examination Report for corresponding Chinese Application No. CN 10645998 dated Dec. 20, 2020.

*Primary Examiner* — Patrick D Niland
(74) *Attorney, Agent, or Firm* — Wood, Phillips, Katz, Clark & Mortimer

(57) ABSTRACT

The present invention relates to a polyurethane, which is particularly suitable as binder for a printing ink, which is obtainable by reacting: a) a polyol component including: i) at least one polytetramethylene glycol, ii) at least one diol having a molecular weight of not more than 200 g/mol being different from polytetramethylene glycol, iii) at least one trivalent or higher-valent alcohol having a molecular weight of not more than 6000 g/mol, b) an isocyanate component including at least one organic diisocyanate compound and c) at least one di-functional amine compound and at least one mono-functional amine compound.

14 Claims, No Drawings

(56) References Cited

U.S. PATENT DOCUMENTS

2015/0291724 A1* 10/2015 Kusano ................ C09J 175/06
　　　　　　　　　　　　　　　　　　　　　　524/591
2015/0361299 A1* 12/2015 Byrne ................ C08G 18/3256
　　　　　　　　　　　　　　　　　　　　　　52/309.13

FOREIGN PATENT DOCUMENTS

| JP | 05222330 A | 8/1993 |
| WO | 94/13723 A1 | 6/1994 |

* cited by examiner

POLYURETHANE BEING SUITABLE AS BINDER FOR A MODULAR PRINTING INK SYSTEM

FIELD OF THE INVENTION

The present invention relates to a polyurethane, which is particularly suitable as binder for a printing ink, to a method for producing such a polyurethane, to a pigment concentrate for preparing a printing ink including such a polyurethane, to a system additive for preparing together with a pigment concentrate a printing ink including such a polyurethane and to a printing ink composed of such a concentrate and such a system additive.

BACKGROUND OF THE INVENTION

Printing inks contain usually pigment, binder and solvent. While the pigment is responsible for the color of the dried printing ink, the solvent has the function to keep the binder and pigment liquid before the printing ink is allowed to dry. During the drying of the printing ink, the solvent evaporates and the binder connects on account of its crosslinking and/or gluing properties the pigment of the printing ink with the printed substrate.

Standard solvent-based printing inks are often based on nitrocellulose as binder and such printing inks offer a stable and high printing quality in low and some medium performance applications. Apart from that, such printing inks are characterized by good hot-sealing properties and water resistance in surface printing. On account of these properties, nitrocellulose based printing inks are often used in gravure and flexographic printing. A further advantage of printing inks on the basis of nitrocellulose is that they allow to create a modular two-component printing ink systems. Such systems comprise firstly a plurality of pigment concentrates each of which including a specifically colored pigment, the same binder and a universal solvent, and secondly several system additives each of which containing the same binder, a technology defining co-binder, such as polyurethane, polyamide or maleic resins, additive(s) and a specific solvent or solvent mixture for a certain printing technique, such as flexographic printing, gravure printing or the like. Co-binders are polymers that substantially influence the overall performance of the ink. Since in all pigment concentrates and in all system additives the same binder is contained, all these components are compatible with each other. By selecting the pigment concentrate with the desired color and the system additive with the suitable solvent for the desired printing technology, the desired printing ink can be produced by simply mixing the pigment concentrate, the system additive and, if required, the additional solvent. However, printing inks on the basis of nitrocellulose have several drawbacks. Firstly, nitrocellulose based printing inks have only a limited adhesion on difficult films and a low bond strength in combination with solvent-based lamination adhesives and are thus not suitable for high performance lamination application. Typically these nitrocellulose based lamination inks contain plasticizing polyurethanes as co-binders. Furthermore, these printing inks are due to their bad stability at high temperatures not suitable for processes including pasteurization and/or sterilization. Rather they are used for low performance applications, such as for printing oriented polypropylene (OPP)/OPP laminates or OPP/polyethylene (PE) laminates, and for medium performance applications, such as for printing polyethylene terephthalate (PET)/aluminum/PET laminates, which do not require a sterilization.

On account of the aforementioned deficiencies, other binders, namely polyvinyl butyral (PVB) and polyvinyl chloride (PVC), are used for printing inks used for high performance applications, such as for printing inks formulated for printing high quality laminates. Printing inks on the basis of these two binders have a very good adhesion on many films and are especially suitable for printing on polyolefine films, polyethyleneterephthalate films, metallized films and the like. However, while printing inks on the basis of PVC are not at all applicable for flexographic printing, printing inks on the basis of PVB are only very limitedly applicable for flexographic printing. Apart from that, PVC is a chlorine containing compound and thus not preferred due to environmental concerns. Moreover, printing inks based on PVB lead in fine screen printing only to comparable bad printing qualities and further has limitations in the obtainable maximal color strength and production speed. Another particular disadvantage of such printing inks is a limited compatibility with other usual printing ink technologies, such as nitrocellulose-based printing ink technologies, which affects the handling during cleaning and during printing ink change.

In recent years also printing inks on the basis of polyurethane binders have been proposed. They show generally a good adhesion on many films and are thus use-able for printing for example PET-films, polyamide films, $AlO_x$-films, $SiO_x$-films and others and are further characterized by a high sterilization stability. However, the dispersion, grinding and stabilization of pigments in a pure polyurethane binder matrix is difficult in terms of rheology, stability and processability of the manufactured concentrate depending on the color index. Additionally, at least some of the proposed polyurethane based inks show well-known printability defects and inferior technological ink properties. On account of these reasons, only very few printing inks on the basis of polyurethane are commercially available. On account of the same reasons, it is not possible to create with the known polyurethanes modular two-component printing ink systems using in all components the same binder, because the known polyurethanes are not compatible with several pigments. Another severe disadvantage of polyurethanes is that they release solvents quickly, which makes it very difficult to adjust the required drying speed for a problem-free printing process without causing well-known printing defects in flexographic or gravure printing. In addition, the known polyurethane-based printing inks, besides other technological properties like blocking or adhesion, tend to lead to cob-webbing in particular during gravure printing. Cob-webbing is a printing defect in which dried bits of ink collect e.g. during gravure printing processes in a web-like formation on the back of the engraved gravure cells, on the doctor blade and on the edges of the impression roller. Thus, cob-webbing is connected with a significant loss of printing quality. All in all, printing inks using polyurethane as binder are desirable, because they are applicable for low as well as for high performance printing applications. However, even if in principle promising, the known polyurethane-based printing inks have a lot of drawbacks.

BRIEF SUMMARY OF THE INVENTION

In view of all this, the object underlying the present invention was to provide a polyurethane binder, which is compatible with any or at least most of the important printing technologies, such as in particular flexographic and gravure printing, into which pigment agglomerates can be easily ground and dispersed, which does not release solvents in an unbalanced way, which does not lead as ingredient of a printing ink to well-known printing defects, like e.g. cob-webbing and which in particular allows to create a modular two-component printing ink system of a series of pigment concentrates and several system additives using in all components the same polyurethane binder.

In accordance with the present invention this objective is satisfied by providing a polyurethane, which is particularly suitable as binder for a printing ink, and, which is obtainable by reacting:
a) a polyol component including:
i) at least one polytetramethylene glycol,
ii) at least one diol having a molecular weight of not more than 200 g/mol being different from polytetramethylene glycol,
iii) at least one trivalent or higher-valent alcohol having a molecular weight of not more than 6,000 g/mol,
b) an isocyanate component including at least one organic diisocyanate compound and
c) at least one di-functional amine compound and at least one mono-functional amine compound.

This solution bases on the surprising findings that a polyurethane comprising the aforementioned three polyol units—i.e. i) polytetramethylene glycol units, ii) low molecular weight diol units being different from polytetramethylene glycol units and iii) low molecular weight branching units of a trivalent or higher-valent alcohol—allows to easily grind pigment agglomerates and to disperse the ground pigment agglomerates therein and that such a polyurethane moreover does, if formulated as binder in a printing ink, not lead to the well-known printing defects during printing.

DETAILED DESCRIPTION OF THE INVENTION

On account of the aforementioned advantages, the polyurethane in accordance with the present invention is compatible with most of all pigments and thus allows to create a modular two-component printing ink system of a series of pigment concentrates and several system additives based on the same polyurethane binder. Such a modular system comprises firstly a plurality of pigment concentrates each of which including a specifically colored pigment, the same binder and a universal solvent, and secondly several system additives each of which containing the same binder, additive(s) and a specific solvent or solvent mixture for a certain printing technique, such as flexographic printing, gravure printing or the like. Since in all pigment concentrates and in all system additives the same binder is contained, all these components are compatible with each other. By selecting the pigment concentrate with the desired color and the system additive with the suitable solvent for the desired printing technology, the desired printing ink can be produced by simply mixing the concentrate, the system additive and, if required, the additional solvent. The printing inks on the basis of the polyurethane in accordance with the present invention are compatible with printing inks based on nitrocellulose.

Also due to the aforementioned advantages, the polyurethane in accordance with the present invention leads in printing inks to a particular high printing quality, so that printing inks based on the polyurethane in accordance with the present invention are suitable for flexographic, gravure printing and gravure monosolvent printing not only for low and medium performance applications, but in particular for high performance applications. This is all the more valid, because the polyurethane in accordance with the present invention leads to printing inks with a high lamination bond strength to substrates of different nature even after sterilization.

Particularly suitable are as polyol component i) are polytetramethylene glycols having a weight-average molecular weight determined by gel permeation chromatography of 162 to 50,000 g/mol. In accordance with the present invention, the weight-average molecular weight of polymers is determined by gel permeation chromatography using a polystyrene standard and a sample concentration of 50 to 70 mg in 10 ml tetrahydrofuran (THF), wherein the column temperature is 30° C., the temperature of the Ri-Detector is 35° C. and the flow rate 1 ml/min. More preferably, the weight-average molecular weight of the polytetramethylene glycol is 300 to 10,000 g/mol, even more preferably 500 to 5,000 g/mol, still more preferably 750 to 3,000 g/mol and most preferably 1,750 to 2,250 g/mol.

Good results are in particular obtained, if the polyol component a) comprises 20 to 80 mol-%, more preferably 30 to 70 mol-%, still more preferably 40 to 60 mol-% and most preferably 45 to 55 mol-% polytetramethylene glycol.

Based on the polymer, it is preferred that the polyurethane comprises 5 to 60 mol-%, preferably 10 to 30 mol-%, more preferably 15 to 25 mol-% and most preferably 15 to 20 mol-% polytetramethylene glycol units.

Suitable examples for the low molecular weight diol, i.e. for the at least one diol having a molecular weight of not more than 200 g/mol, are compounds selected from the group consisting of ethylene glycol, propylene glycol, butane diol, pentane diol, hexane diol, heptane diol, octane diol, nonane diol, decane diol, 1,3-methylpropane diol, cyclohexanedimethanol, neopentylglycol, 2-methyl-2,4-pentanediol, 1,4-cyclohexanediol, and mixtures of two or more of the aforementioned compounds.

Particular good results are obtained, when the at least one low molecular weight diol is ethylene glycol, propylene glycol, 1,4-butane diol, 1,6-hexane diol or a mixture of two or more of the aforementioned diols, wherein 1,4-butane diol is most preferable.

Preferably, the polyol component a) comprises 15 to 75 mol-%, more preferably 25 to 65 mol-%, even more preferably 35 to 55 mol-% and most preferably 40 to 50 mol-% of the low molecular diol.

Based on the polymer, it is preferred that the polyurethane comprises 2 to 50 mol-%, more preferably 5 to 30 mol-%, still more preferably 10 to 25 mol-% and most preferably 15 to 20 mol-% diol units.

In a further development of the idea of the present invention, it is suggested that the at least one trivalent or higher-valent alcohol having a molecular weight of not more than 6,000 g/mol is selected from the group consisting of trimethylolpropane, di-trimethylolpropane, glycerol, pentaerythritol, di-pentaerythritol, alkoxylated pentaerythritol, alkoxylated di-pentaerythritol, xylitol, inositol (cyclohexanehexol) and other suitable polyols, e.g. from Perstop (e.g. Polyol 3165, Polyol 4290, Polyol R3600, Boltorn H2004, Boltorn H311) and mixtures of two or more of the aforementioned compounds.

Preferably, the polyol component consists of the aforementioned compounds i), ii) and iii), i.e. it contains no further ingredients.

In particular, it is preferred—independently from whether the polyol component consists of the aforementioned compounds i), ii) and iii) or whether it contains other compounds—that the polyol component does not contain any tertiary amine. Also, it is preferred that the polyol component does not contain a monofunctional amine, which includes a silane group.

In accordance with the present invention, it is preferred that the polyurethane has a specific, comparable low branching degree, which is adjusted by the amount of used trivalent or higher-valent alcohol. In view of this, it is preferred that the polyol component a) comprises 0.5 to 30 mol-%, more preferably 1 to 20 mol-%, still more preferably 2 to 10 mol-% and most preferably 3 to 5 mol-% trivalent or higher-valent alcohol.

Based on the polymer, it is preferred that the polyurethane comprises 0.2 to 5 mol-%, preferably 0.5 to 3 mol-%, more preferably 1 to 2.5 mol-% and most preferably 1.0 to 2.0 mol-% trivalent alcohol units.

Good results are in particular obtained, if the molar ratio of trivalent or higher-valent alcohol units to polytetramethylene glycol units in the polyurethane is 1:5 to 1:20, more preferably 1:8 to 1:17, even more preferably 1:10 to 1:15, still more preferably 1:11 to 1:14 and most preferably 1:12 to 1:13.

Concerning the kind of organic diisocyanate compound b), the present invention is not particularly limited. Thus, in principle all known diisocyanate compounds may be used as component b). However, it has been turned out that polyurethanes with suitable properties are in particular obtained, if the at least one organic diisocyanate compound b) is selected from the group consisting of toluene-2,4-diisocyanate, methylendiphenylisocyanate, hexamethylene diisocyanate, 1,5-naphthalene diisocyanate, isophorone diisocyanate, tetramethylxylylene diisocyanate, cyclohexane diisocyanate (CHDI), polymeric diphenylmethandiisocyanate (PMDI), p-phenylene diisocyanate (PPDI) and mixtures of two or more of the aforementioned compounds.

In accordance with a particular preferred embodiment of the present invention, the polyurethane comprises 40 to 90 mol-%, more preferably 50 to 80 mol-%, even more preferably 50 to 70 mol-% and most preferably 50 to 65 mol-% organic diisocyanate units.

Likewise, it is preferred that the molar ratio of isocyanate units to polyol units in the polyurethane is 1:1 to 1:2, more preferably 1:1.2 to 1:1.8, even more preferably 1:1.4 to 1:1.8 and most preferably 1:1.5 to 1:1.7.

Also concerning the kind of di-functional amine compound, the present invention is not particularly limited. Suitable examples for the di-functional amine compound are those selected from the group consisting of isophorone diamine, diethyl toluenediamine, dimethyl toluenediamine, hexamethylenediamine, tetramethylenediamine, ethylenediamine, phenylenediamine, diaminocyclohexane, diaminodicyclohexane, diaminodiphenylmethane, polyether diamines, 1,3-diaminopropane, 1,5-diaminopentane, 1,2-diaminopropane, diphenyl ethylene diamin, 2,5-diaminotoluene, triethylenediamine, 1,8-diaminooctane, 1,10-diaminodecane, 2,4'-diaminodiphenylmethane, 1,3-propanediamine, 2,2-dimethyl-, 1,5-pentanediamine, 2-methyl-, 1,2-benzenediamine, 3(or 4)-methyl-, and mixtures of two or more of the aforementioned compounds.

In a further development of the idea of the present invention, it is suggested that the molar ratio of the di-functional amine compound to the isocyanate compound is 1:1 to 1:10, more preferably 1:3 to 1:8, even more preferably 1:4 to 1:7 and most preferably 1:5 to 1:6.

Suitable examples for the mono-functional amine compound are those selected from the group consisting of methylamine, ethylamine, propylamine, butylamine, pentylamin, hexylamin, heptylamin, octylamine, nonylamin, n-dodecylamine, cyclohexylamine, cyclopentylamine, anilin, phenethylamine, 2-methyl-2-benzylamine, 2-ethyl-hexylamine, 1,1,3,3-tetramethyl-butylamine and mixtures of two or more of the aforementioned compounds.

Preferably, the molar ratio of the mono-functional amine compound to the isocyanate compounds is 1:0.5 to 1:10, more preferably 1:1 to 1:6, even more preferably 1:2 to 1:5 and most preferably 1:3 to 1:4.

In accordance with a further particular preferred embodiment of the present invention, the polyurethane has a weight-average molecular weight determined by gel permeation chromatography of 5,000 to 200,000 g/mol, wherein the weight-average molecular weight of the polyurethane is determined as described above. More preferably, the weight-average molecular weight of the polyurethane is 10,000 to 100,000 g/mol, even more preferably 10,000 to 80,000 g/mol, still more preferably 20,000 to 60,000 g/mol and most preferably 25,000 to 55,000 g/mol.

As a combination of the aforementioned preferred embodiments, particular good results are obtained in accordance with the present invention with a polyurethane, which is obtainable by first reacting:
  a) a polyol component including:
    i) at least one polytetramethylene glycol,
    ii) at least one diol having a molecular weight of not more than 200 g/mol being different from polytetramethylene glycol,
    iii) at least one trivalent or higher-valent alcohol having a molecular weight of not more than 500 g/mol and
  b) an isocyanate component including at least one organic diisocyanate compound selected from the group consisting of toluene-2,4-diisocyanate, methylendiphenylisocyanate, hexamethylene diisocyanate, 1,5-naphthalene diisocyanate, isophorone diisocyanate, tetramethylxylylene diisocyanate, cyclohexane diisocyanate (CHDI), polymeric diphenylmethandiisocyanate (PMDI), p-phenylene diisocyanate (PPDI) and mixtures of two or more of the aforementioned compounds,
  wherein the molar ratio of isocyanate compound(s) to the sum of polyol compounds is 1:1.4 to 1:1.8,
  and then reacting the so obtained prepolymer with a di-functional amine compound and a mono-functional amine compound.

Even more preferably, the polyurethane in accordance with the present invention is obtainable by first reacting:
  a) a polyol component including:
    i) 30 to 70 mol-% of at least one polytetramethylene glycol having a weight-average molecular weight of 500 to 5,000 g/mol,
    ii) 25 to 65 mol-% of at least one diol selected from the group consisting of ethylene glycol, propylene glycol, butane diol, hexane diol and mixtures of two or more of the aforementioned compounds,
    iii) 2 to 10 mol-% of at least one trivalent or higher-valent alcohol selected from the group consisting of trimethylolpropane, ditrimethylolpropane, glycerol, pentaerythritol, di-pentaerythritol, alkoxylated pentaerythritol, alkoxylated di-pentaerythritol, xylitol, inositol (cyclohexanehexol), or other suitable polyols e.g. from Perstop (e.g. Polyol 3165, Polyol 4290, Polyol R3600, Boltorn H2004, Boltorn H311), and mixtures of two or more of the aforementioned compounds and b) an isocyanate component including at least one organic diisocyanate compound selected from the group consisting of toluene-2,4-diisocyanate, methylendiphenylisocyanate, hexamethylene diisocyanate, 1,5-naphthalene diisocyanate, isophorone diisocyanate, tetramethylxylylene diisocyanate, cyclohexane diisocyanate (CHDI), polymeric diphenylmethandiisocyanate (PMDI), p-phenylene diisocyanate (PPDI) and mixtures of two or more of the aforementioned compounds, wherein the molar ratio of isocyanate compound(s) to the sum of polyol compounds is 1:1.4 to 1:1.8, and then reacting the so obtained prepolymer with a di-functional amine compound and a mono-functional amine compound, wherein the di-functional amine compound is selected from the group consisting of isophorone diamine, diethyl toluenediamine, dimethyl toluenediamine, hexamethylenediamine, tetramethylenediamine, ethylenediamine, phenylenediamine, diaminocyclohexane, diaminodicyclohexane, diaminodiphenylmethane, Polyether diamines, 1,3-diaminopropane, 1,5-diaminopentane, 1,2-diaminopropane, diphenyl ethylene diamin, 2,5-diaminotoluene, triethylenediamine, 1,8-diaminooctane, 1,10-diaminodecane, 2,4'-diaminodiphenylmethane, 1,3-propanediamine, 2,2-dimethyl-, 1,5-pentanediamine, 2-methyl-, 1,2-benzenediamine, 3(or 4)-methyl-, 4-aminoheptane and mixtures of two or more of the aforementioned compounds, wherein the mono-functional amine compound is selected from the group consisting of methylamine, ethylamine, propylamine, butylamine, pentylamin, hexylamin, heptylamin, octylamine, nonylamin, n-dodecylamine, cyclohexylamine, cyclopentylamine, anilin, phenethylamine, 2-methyl-2-benzylamine, 2-ethyl-hexylamine, 1,1,3,3-tetramethyl-butylamine and mixtures of two or more of the aforementioned compounds, wherein the molar ratio of the di-functional amine compound to the isocyanate compound is 1:4 to 1:7, and, wherein the molar ratio of the mono-functional amine compound to the isocyanate compounds is 1:2 to 1:5.

Moreover, it is preferred that the polyurethane according to the present invention does not contain any polyester group.

In addition, it is preferred that the polyurethane according to the present invention cures physically and not chemically.

A further aspect of the present invention is a method for preparing a polyurethane as described above, wherein the method comprises reacting:

a) a polyol component including:

i) at least one polytetramethylene glycol, ii) at least one diol being different from polytetramethylene glycol, iii) at least one trivalent or higher-valent alcohol, b) an isocyanate component including at least one organic diisocyanate compound and c) at least one di-functional amine compound and at least one mono-functional amine compound.

The first reaction step may be performed for instance at a temperature of 90 to 95° C. for 2 to 3 hours and preferably at a temperature of 90 to 92° C. for 2.5 hours, wherein the second reaction step may be conducted at a temperature of 50 to 75° C. for 30 to 60 minutes and preferably at a temperature of 50 to 65° C. for 30 minutes. The addition of the remaining amount of monoethanolamine is carried out at a temperature of 65-75° C. and stirred for 15-60 minutes, preferably at 70-75° C. for 30-60 minutes.

In a further development of the idea of the present invention, it is suggested that the method for preparing the polyurethane comprises:

a first step of reacting:

a) a polyol component including:

i) 30 to 70 mol-% of at least one polytetramethylene glycol having a weight-average molecular weight of 500 to 5,000 g/mol, ii) 25 to 65 mol-% of at least one diol selected from the group consisting of ethylene glycol, propylene glycol, butane diol, pentane diol, hexane diol, heptane diol, octane diol, nonane diol, decane diol, 1,3-methylpropane diol, cyclohexanedimethanol, neopentylglycol, 2-methyl-2,4pentanediol, 1,4-cyclohexanediol and mixtures of two or more of the aforementioned compounds, iii) 2 to 10 mol-% of at least one trivalent or higher-valent alcohol selected from the group consisting of trimethylolpropane, di-trimethylolpropane, glycerol, pentaerythritol, di-pentaerythritol, alkoxylated pentaerythritol, alkoxylated di-pentaerythritol, xylitol, inositol (cyclohexanehexol), or other suitable polyols e.g. from Perstop (e.g. Polyol 3165, Polyol 4290, Polyol R3600, Boltorn H2004, Boltorn H311), and mixtures of two or more of the aforementioned compounds and b) an isocyanate component including at least one organic diisocyanate compound, and a second step of reacting the prepolymer product obtained in the first step with a di-functional amine compound and a mono-functional amine compound.

In accordance with a still further aspect, the present invention relates to a pigment concentrate for preparing a printing ink containing at least one aforementioned polyurethane, at least one pigment and at least one solvent.

Since the polyurethane of the present invention is compatible with virtually all pigments conventionally used for printing inks, the present invention is not limited concerning the kind of pigment. Examples for suitable pigments are Diacetanil Yellow 1715C (Capelle), Permanent Rubin P-F 7 B (Clariant), Permanent Rubin F 6 B (Clariant), Blue GSP-M51 Chromofine (Daicolor), Printex 35 (Orion), Sincol Yellow 1126-003 (Union Colours), Diacetanil Orange HTT 3427C (Capelle), Hostaperm Violet P-RL (Clariant), Sinco Green 5436-370 (Union Colours).

Likewise, the present invention is not particularly limited concerning the solvent of the pigment concentrate. Suitable examples are ethyl acetate, n-propyl acetate, isopropyl acetate, ethanol, n-propanol, isopropanol and mixtures of two or more of the aforementioned solvents.

In accordance with a further particular preferred embodiment of the present invention, the pigment concentrate contains:

5 to 30% by weight and preferably 8 to 18% by weight of at least one polyurethane as described above, 10 to 30% by weight and preferably 15 to 30% by weight of at least one pigment, solvent, which is preferably selected from the group consisting of acetate, n-propyl acetate, isopropyl acetate, ethanol, n-propanol, isopropanol mixtures of two or more of the aforementioned solvents and optionally at least one grinding auxiliary, wherein the sum of all components is 100% by weight.

As grinding auxiliary for example any compound selected from the group consisting of maleic resins, polyamides, ethylcellulose, PVB, ketonic resins, dispersing agents, and mixtures of two or more of the aforementioned compounds may be used.

In accordance with a still further aspect, the present invention relates to a system additive for preparing a printing ink containing at least one polyurethane as described above and at least one solvent, wherein the solvent is preferably any of the below:

a) a mixture of ethanol and ethyl acetate, wherein the weight ratio of ethanol to ethyl acetate in the mixture is preferably 20:1 to 1:1, more preferably 15:1 to 5:1, even more preferably 12:1 to 7:1 and most preferably 10:1 to 8:1, and optionally further containing n-propanol and/or ethoxy propanol, or b) a mixture of i) ethyl acetate and/or ii) ethoxypropanol and/or iii) propylacetate and/or ethyllactate and/or Methoxypropanol and/or Dowanol DPM and/or ethanol, wherein the weight ratio of ethyl acetate to the sum of ethoxypropanol and ethanol in the mixture is preferably 20:1 to 10:1, or c) ethyl acetate.

While the solvent of alternative a) is particularly suitable for flexographic printing, the solvent of alternative b) is particularly suitable for gravure printing and the solvent of alternative c) is particularly suitable for gravure monosolvent printing.

Preferably, the system additive contains:

30 to 70% by weight and preferably 45 to 65% by weight of at least one polyurethane in accordance with any of claims 1 to 24, 30 to 70% by weight and preferably 45 to 65% by weight of at least one solvent, 0 to 5% of additives well-known to those skilled in the art like fillers, waxes, slip additives, adhesion promoters, wetting agents, defoamers, crosslinkers or mixtures thereof.

wherein the sum of all components is 100% by weight.

A further aspect of the present invention is a kit, which is in particular suitable for preparing a printing ink, wherein the kit comprises:

at least one pigment concentrate as described above and
at least one system additive as described above and
additional solvents to adjust printing viscosity In accordance with still a further aspect, the present invention relates to a printing ink, which is in particular suitable for flexographic printing, wherein the printing ink contains a pigment concentrate as described above and at least one system additive as described above, wherein the solvent in the system additive is a mixture of ethanol and ethyl acetate and optionally further containing n-propanol and/or ethoxy propanol.

In accordance with still a further aspect, the present invention relates to a printing ink, which is in particular suitable for gravure applications, wherein the printing ink contains a pigment concentrate as described above and at least one system additive as described above, wherein the solvent in the system additive is a mixture of i) ethyl acetate and ii) ethoxypropanol and iii) n-propylacetate and/or ethanol, In accordance with still a further aspect, the present invention relates to a printing ink, which is in particular suitable for gravure monosolvent applications, wherein the printing ink contains a pigment as described above and at least one system additive as described above, wherein the solvent in the system additive is ethyl acetate.

Subsequently, the present invention is described by means of an example, which illustrates, but not restricts the present invention.

EXAMPLE 1

For the production of 100 kg of a polyurethane according to the present invention a vessel was charged with 18.2 kg PTMEG-2000, stirred and heated up to 110° C. to 115° C. Then, 0,23 kg Di-TMP were added, stirred for another 15 minutes and vacuum was applied for half an hour. The heating was switched off so that the mixture could cool down to 55 to 60° C. 7.45 kg IPDI were added and stirred, then 0.9 kg butandiol were added. After 10 minutes of stirring 0.007 kg of tetrabutyltitanate were added. The temperature raised automatically up to about 90° C. The temperature should not exceed 95° C. The mixture was kept at this temperature for at least 2.5 hours and stirred well until the NCO content was 2.8-3.2% as determined by titration. The mixture was allowed to cool down to 85° C., then 35 kg ethylacetate and 0.137 kg of water were added. After 10 minutes another 35.596 kg ethylacetate were added. A mixture of 1.28 kg IPDI, 0.04 kg monoethanolamin and 1 kg of ethylacetate was prepared and added stepwise to the reaction vessel when the temperature in the vessel was 50 to 65° C. After 30 minutes temperature were raised to 65 to 70° C. and 0.16 kg of monoethanolamine were added slowly during 15 minutes to the mixture. The amine value of the prepared product should be 1.4-1.7 mg KOH/g, and can be determined by titration. Perhaps longer reaction time at 70 to 75° C. may be required. After cooling the polyurethane was ready for usage.

Suitable amounts of the used compounds are listed in the following table:

| RM CODE | Description | Mw | Quantity in g | Preferred min. Qty. | Preferred max Qty. | Most Preferred min. Qty. | Most Preferred max Qty |
|---|---|---|---|---|---|---|---|
| C-476 | PTMEG-2000 | 2000 | 18.2 | 15.000 | 25.000 | 15.000 | 20.000 |
| C-036 | 1,4 Butandiol | 90 | 0.9 | 0.500 | 1.500 | 0.500 | 1.000 |
| C-284 | Di TMP | 250 | 0.23 | 0.100 | 0.400 | 0.200 | 0.300 |
| C-219 | IPDI | 222 | 7.45 | 5.000 | 10.000 | 6.000 | 8.000 |
| A-036 | Tetra-butyltitanate | 340 | 0.007 | | | | |
| S-035 | Ethyl Acetate | | 71.396 | | | | |
| C-230 | IPDA | 170 | 1.28 | 0.500 | 1.500 | 0.700 | 1.300 |
| A-017 | MEA | 61 | 0.4 | 0.100 | 1.500 | 0.300 | 1.0 |
| Water | Water | 18 | 0.137 | | | | |
| Total | | | 100 | | | | |

EXAMPLE 2

Another polyurethane was prepared according to the process described for example 1 with compounds and amounts listed in the following table:

| RM CODE | Discription | Qty gms | Preferred min Qty. | Preferred max. Qty. | Most Preferred min Qty. | Most Preferred max. Qty. |
|---|---|---|---|---|---|---|
| C-327/495 | PPG-1000 | 18.02 | 15 | 25 | 15 | 20 |
| C-306 | 1,3 MPD | 0.8 | 0.5 | 1.2 | 0.6 | 1 |
| C-284 | Di TMP | 0.18 | 0.1 | 0.25 | 0.15 | 0.2 |
| C-219 | IPDI | 8.68 | 8 | 9.5 | 8.5 | 9 |
| A-036 | BT | 0.01 | | | | |
| S-035 | Ethyl Acetate | 70.5 | | | | |
| C-230 | IPDA | 1.05 | 0.5 | 1.5 | 0.8 | 1.2 |
| A-017 | MEA | 0.62 | 0.3 | 1.2 | 0.5 | 1 |
| Water | Water | 0.14 | | | | |
| Total | | 100 | | | | |

EXAMPLE 3

Another polyurethane according to the invention was also prepared following the synthesis description of example 1. The used compounds and suitable ranges are listed in the following table:

| RM CODE | Discription | Qty gms | Preferred min Qty. | Preferred max. Qty. | Most Preferred min Qty. | Most Preferred max. Qty. |
|---|---|---|---|---|---|---|
| C-476 | PTMEG-2000 | 19.43 | 15 | 25 | 15 | 20 |
| C-036 | 1,4 Butendiol | 0.81 | 0.5 | 1.2 | 0.6 | 1 |
| C-005 | TMP | 0.14 | 0.1 | 0.2 | 0.1 | 0.15 |
| C-219 | IPDI | 6.91 | 6 | 8 | 6.5 | 7.5 |
| A-036 | BT | 0.01 | | | | |
| S-035 | Ethyl Acetate | 70.95 | | | | |
| C-230 | IPDA | 0.91 | 0.5 | 1.5 | 0.8 | 1.2 |
| A-017 | MEA | 0.7 | 0.3 | 1.2 | 0.5 | 1 |
| Water | Water | 0.14 | | | | |
| Total | | 100 | | | | |

What is claimed is:

1. A polyurethane being suitable as binder for a printing ink, which is obtained by reacting:
   a) a polyol component including:
      i) at least one polytetramethylene glycol,
      ii) at least one diol having a molecular weight of not more than 200 g/mol being different from polytetramethylene glycol,
      iii) at least one trivalent or higher-valent alcohol,
   b) an isocyanate component including at least one organic diisocyanate compound and
   c) at least one di-functional amine compound and at least one mono-functional amine compound and
   wherein i) the polyurethane does not contain any polyester group or wherein ii) the polyurethane cures physically and not chemically and
   d) wherein the at least one trivalent or higher-valent alcohol is selected from the group consisting of trimethylolpropane, di-trimethylolpropane, glycerol, pentaerythritol, di-pentaerythritol, xylitol, inositol (cyclohexanehexol) and mixtures of two or more of the aforementioned compounds, wherein the polyurethane comprises 0.2 to 5 mol-% trivalent alcohol units.

2. The polyurethane in accordance with claim 1, wherein the polyurethane comprises 5 to 60 mol-% glycol units.

3. The polyurethane in accordance with claim 1, wherein the at least one diol having a molecular weight of not more than 200 g/mol is selected from the group consisting of ethylene glycol, propylene glycol, butane diol, pentane diol, hexane diol, heptane diol, octane diol, nonane diol, decane diol, 1,3-methylpropane diol, cyclohexanedimethanol, neopentylglycol, 2-methyl-2,4pentanediol, 1,4-cyclohexanediol and mixtures of two or more of the aforementioned compounds, wherein the polyurethane comprises 2 to 50 mol-%, diol units.

4. The polyurethane in accordance with claim 1, wherein the molar ratio of trivalent or higher-valent alcohol units to polytetramethylene glycol units in the polyurethane is 1:5 to 1:20.

5. The polyurethane in accordance with any of the claim 1, wherein the molar ratio of isocyanate units to polyol units in the polyurethane is 1:1 to 1:2.

6. The polyurethane in accordance with claim 1, wherein the di-functional amine compound is selected from the group consisting of isophorone diamine, diethyl toluenediamine, dimethyl toluenediamine, hexamethylenediamine, tetramethylenediamine, ethylenediamine, phenylenediamine, diaminocyclohexane, diaminodicyclohexane, diaminodiphenylmethane, polyether diamines, 1,3-diaminopropane, 1,5-diaminopentane, 1,2-diaminopropane, diphenyl ethylene diamin, 2,5-diaminotoluene, triethylenediamine, 1,8-diaminooctane, 1,10-diaminodecane, 2,4'-diaminodiphenyl-methane, 1,3-propanediamine, 2,2-dimethyl-, 1,5-pentanediamine, 2-methyl-, 1,2-benzenediamine, 3(or 4)-methyl-, 4-aminoheptane, and mixtures of two or more of the aforementioned compounds, wherein the molar ratio of the di-functional amine compound to the isocyanate compound is 1:1 to 1:10.

7. The polyurethane in accordance with claim 1, wherein the mono-functional amine compound is selected from the group consisting of methylamine, ethylamine, propylamine, butylamine, pentylamin, hexylamin, heptylamin, octylamine, nonylamin, n-dodecylamine, cyclohexylamine, cyclopentylamine, anilin, phenethylamine, 2-methyl-2-benzylamine, 2-ethyl-hexylamine, 1,1,3,3-tetramethyl-butylamine and mixtures of two or more of the aforementioned compounds, wherein the molar ratio of the mono-functional amine compound to the isocyanate compounds is 1:0.5 to 1:10.

8. The polyurethane in accordance with claim 1, wherein the polyurethane has a weight-average molecular weight determined by gel permeation chromatography of 5,000 to 200,000 g/mol.

9. The polyurethane in accordance with claim 1, wherein the polyurethane is obtained by first reacting:
   a) a polyol component including:
      i) 30 to 70 mol-% of at least one polytetramethylene glycol having a weight-average molecular weight of 500 to 5,000 g/mol,
      ii) 25 to 65 mol-% of at least one diol selected from the group consisting of ethylene glycol, propylene glycol, butane diol, pentane diol, hexane diol, heptane diol, octane diol, nonane diol, decane diol, 1,3-methylpropane diol, cyclohexanedimethanol, neopentylglycol, 2-methyl-2,4pentanediol, 1,4-cyclohexanediol and mixtures of two or more of the aforementioned compounds, iii) 2 to 10 mol-% of at least one trivalent or higher-valent alcohol selected from the group consisting of trimethylolpropane, di-trimethylolpropane, glycerol, pentaerythritol, di-pentaerythritol, xylitol, inositol (cyclohexanehexol) and mixtures of two or more of the aforementioned compounds and b) an isocyanate component including at least one organic diisocyanate compound selected from the group consisting of toluene-2,4-diisocyanate, methylendiphenylisocyanate, hexamethylene diisocyanate, 1,5-naphthalene diisocyanate, isophorone diisocyanate, tetramethylxylylene diisocyanate, cyclohexane diisocyanate (CHDI), polymeric diphenylmethandiisocyanate (PMDI), p-phenylene diisocyanate (PPDI) and mixtures of two or more of the aforementioned compounds, wherein the molar ratio of isocyanate compound(s) to the sum of polyol compounds is 1:1.4 to 1:1.8, and then reacting the so obtained prepolymer with a di-functional amine compound and a mono-functional amine compound, wherein the di-functional amine compound is selected from the group consisting of isophorone diamine, diethyl toluenediamine, dimethyl toluenediamine, hexamethylenediamine, tetramethylenediamine, ethylenediamine, phenylenediamine, diaminocyclohexane, diaminodicyclohexane, diaminodiphenylmethane, Polyether diamines, 1,3-diaminopropane, 1,5-diaminopentane, 1,2-diaminopropane, diphenyl ethylene diamin, 2,5-diaminotoluene, triethylenediamine, 1,8-diaminooctane, 1,10-diaminodecane, 2,4'-diaminodiphenyl-methane, 1,3-propanediamine, 2,2-dimethyl-, 1,5-pentanediamine, 2-methyl-, 1,2-benzenediamine, 3(or 4)-methyl-, 4-aminoheptane, and mixtures of two or more of the aforementioned compounds, wherein the mono-functional amine compound is selected from the group consisting of methylamine, ethylamine, propylamine, butylamine, pentylamin, hexylamin, heptylamin, octylamine, nonylamin, n-dodecylamine, cyclohexylamine, cyclopentylamine, anilin, phenethylamine, 2-methyl-2-benzylamine, 2-ethyl-hexylamine, 1,1,3,3-tetramethyl-butylamine and mixtures of two or more of the aforementioned compounds, wherein the molar ratio of the di-functional amine compound to the isocyanate compound is 1:4 to 1:7, and, wherein the molar ratio of the mono-functional amine compound to the isocyanate compounds is 1:2 to 1:5.

10. A method for preparing a polyurethane in accordance with claim 1 comprising reacting:
a) a polyol component including:
i) at least one polytetramethylene glycol,
ii) at least one diol being different from polytetramethylene glycol,
iii) at least one trivalent or higher-valent alcohol,
b) an isocyanate component including at least one organic diisocyanate compound and
c) at least one di-functional amine compound and at least one mono-functional amine compound.

11. A pigment concentrate, which contains:
5 to 30% by weight of at least one polyurethane in accordance with claim 1,
10 to 30% by weight of at least one pigment,
solvent and
optionally at least one grinding auxiliary,
wherein the sum of all components is 100% by weight.

12. A system additive for preparing a printing ink containing at least one polyurethane in accordance with claim 1 and at least one solvent, wherein the solvent is any of the below:
a) a mixture of ethanol and ethyl acetate or
b) a mixture of i) ethyl acetate and ii) ethoxypropanol and iii) propylacetate and/or ethanol or
c) ethyl acetate.

13. A kit for preparing a printing ink comprising:
at least one pigment concentrate,
at least one system additive and
additional solvent to achieve print viscosity,
wherein
the at least one pigment concentrate comprises
5 to 30% by weight of a first at least one polyurethane,
10 to 30% by weight of at least one pigment,
solvent and
optionally at least one grinding auxiliary,
wherein the sum of all components is 100% by weight, and wherein
the at least one system additive comprises a second at least one polyurethane and at least one solvent, wherein the solvent is any of the below:
a) a mixture of ethanol and ethyl acetate or
b) a mixture of i) ethyl acetate and ii) ethoxypropanol and iii) propylacetate and/or ethanol or
c) ethyl acetate,
and further wherein the first at least one polyurethane and the second at least one polyurethane are both in accordance with claim 1.

14. A printing ink for flexographic printing containing:
a first pigment concentrate and at least one first system additive in, wherein the solvent in the system additive is a mixture of ethanol and ethyl acetate,
and/or
a second pigment concentrate and at least one second system additive, wherein the solvent in the system additive is a mixture of i) ethyl acetate and ii) ethoxypropanol and iii) propylacetate and/or ethanol,
and/or
a third pigment concentrate and at least one third system additive, wherein the solvent in the system additive is ethyl acetate wherein
each of the first, second and third pigment concentrates comprises
5 to 30% by weight of a first at least one polyurethane,
10 to 30% by weight of at least one pigment,
solvent and
optionally at least one grinding auxiliary,
wherein the sum of all components is 100% by weight, and wherein
each of the at least one first, at least one second, and the at least one third system additives comprises a second at least one polyurethane and at least one solvent, wherein the solvent is any of the below:
a) a mixture of ethanol and ethyl acetate or
b) a mixture of i) ethyl acetate and ii) ethoxypropanol and iii) propylacetate and/or ethanol or
c) ethyl acetate,
and further wherein the first at least one polyurethane and the second at least one polyurethane are both in accordance with claim 1.

* * * * *